United States Patent
Priyanto et al.

(10) Patent No.: US 12,294,887 B2
(45) Date of Patent: May 6, 2025

(54) ENHANCED BUFFER STATUS REPORT (BSR) PROCEDURE BASED ON PACKET ARRIVAL RATE OF DATA ENTERING THE BUFFER

(71) Applicant: Sony Group Corporation, Tokyo (JP)

(72) Inventors: Basuki Priyanto, Lund (SE); Rui Nunes, Lund (SE); Adnan Prlja, Malmo (SE); Ola Cedell, Malmo (SE); Mitsuru Goto, Tokyo (JP); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 335 days.

(21) Appl. No.: 17/792,644

(22) PCT Filed: Dec. 8, 2020

(86) PCT No.: PCT/EP2020/085127
§ 371 (c)(1),
(2) Date: Jul. 13, 2022

(87) PCT Pub. No.: WO2021/151566
PCT Pub. Date: Aug. 5, 2021

(65) Prior Publication Data
US 2023/0096944 A1 Mar. 30, 2023

(30) Foreign Application Priority Data
Jan. 28, 2020 (SE) .................................... 2050079-9

(51) Int. Cl.
*H04W 28/02* (2009.01)
*H04W 72/21* (2023.01)
(52) U.S. Cl.
CPC ....... *H04W 28/0278* (2013.01); *H04W 72/21* (2023.01)

(58) Field of Classification Search
CPC . H04W 28/0278; H04W 72/21; H04W 71/51; H04W 72/23; H04W 28/02; H04W 72/1268; H04W 28/0247; H04W 28/0284
See application file for complete search history.

(56) References Cited

U.S. PATENT DOCUMENTS 9,066,361 B2 6/2015 Bucknell et al.
2007/0248035 A1* 10/2007 Sang .................. H04W 52/346
370/318

(Continued)

FOREIGN PATENT DOCUMENTS

CN 101978765 A 2/2011
CN 104170493 A 11/2014

(Continued)

OTHER PUBLICATIONS

International Search Report and Written Opinion from corresponding International Application No. PCT/EP2020/085127, mailed on Feb. 9, 2021, 10 pages.

(Continued)

*Primary Examiner* — Mewale A Ambaye
(74) *Attorney, Agent, or Firm* — Tucker Ellis LLP

(57) ABSTRACT

A method carried out in a User Equipment, UE, for controlling uplink transmission of data to a base station of a wireless network, includes: transmitting, to the base station, a buffer status report, BSR, indicative of a buffer data level value; transmitting, to the base station, information indicative of packet arrival rate of data entering the transmit buffer; receiving uplink resource information from the base station, in response to the BSR and said information; and transmitting data from the buffer using the received resource information.

17 Claims, 9 Drawing Sheets

(56) References Cited

U.S. PATENT DOCUMENTS

| | | | | |
|---|---|---|---|---|
| 2008/0101286 A1* | 5/2008 | Wang | ............... | H04W 72/1268 |
| | | | | 370/329 |
| 2013/0250828 A1* | 9/2013 | Chou | ................... | H04W 72/23 |
| | | | | 370/329 |
| 2016/0156563 A1 | 6/2016 | Timner et al. | | |
| 2017/0071010 A1* | 3/2017 | Lim | ..................... | H04W 72/21 |
| 2019/0342903 A1 | 11/2019 | Yu et al. | | |
| 2020/0022134 A1 | 1/2020 | Ohta et al. | | |
| 2023/0134245 A1* | 5/2023 | Rossbach | ............. | H04W 72/11 |
| | | | | 370/329 |
| 2023/0284290 A1* | 9/2023 | Lanante | ............. | H04W 74/085 |
| | | | | 370/329 |
| 2023/0354292 A1* | 11/2023 | Awoniyi-Oteri | ...... | H04L 1/1822 |

FOREIGN PATENT DOCUMENTS

| | | | | |
|---|---|---|---|---|
| EP | 2958387 A1 * | 12/2015 | ........ | H04W 28/0278 |
| WO | 2019032734 A1 | 2/2019 | | |
| WO | 2019154223 A1 | 8/2019 | | |
| WO | 2019157947 A1 | 8/2019 | | |

OTHER PUBLICATIONS

Office Action and Search Report from corresponding Swedish Application No. 2050079-9, mailed on Sep. 25, 2020, 8 pages.
Samsung, "Report on email discussion [106#46][IAB]: Low-latency scheduling," 3rd Generation Partnership Project (3GPP) TSG-RAN #107-bis, R2-1912572, Oct. 14-18, 2019, 52 pages.
Huawei et al., "Enhancement on BSR format for the one LCG case," 3rd Generation Partnership Project (3GPP) TSG-RAN WG2 Meeting #108, R2-1915485, Nov. 18-22, 2019, 5 pages.

\* cited by examiner

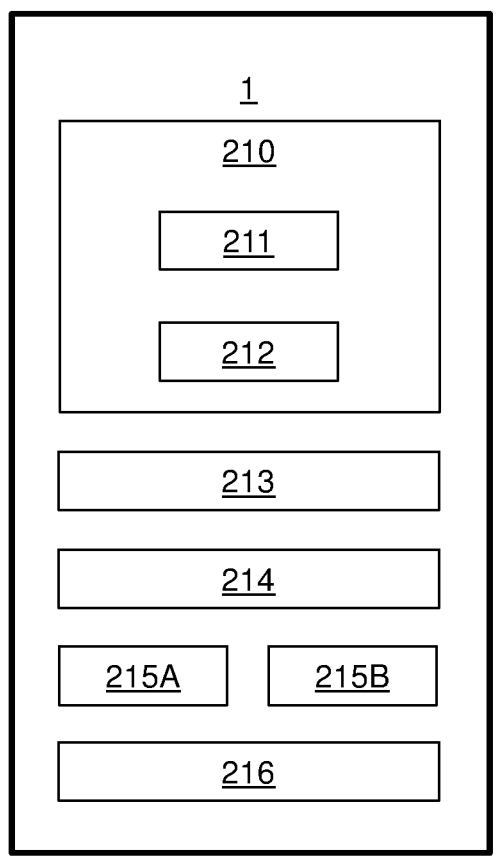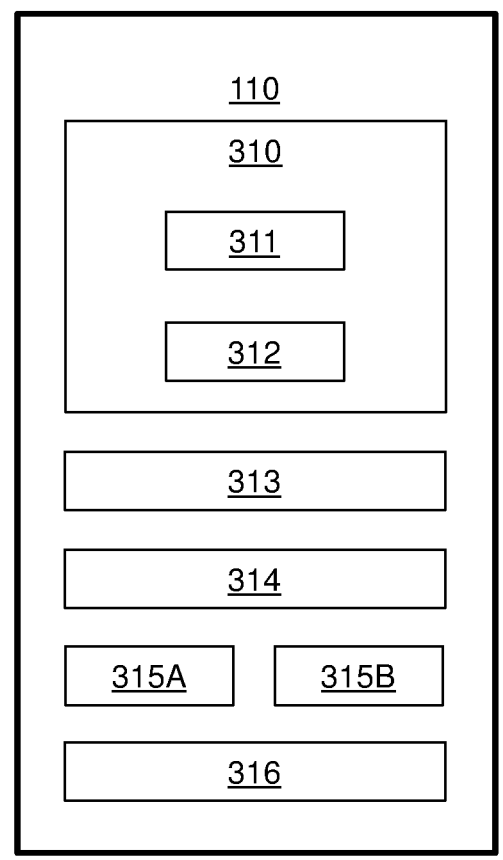
Fig. 2
Fig. 3

ENHANCED BUFFER STATUS REPORT (BSR) PROCEDURE BASED ON PACKET ARRIVAL RATE OF DATA ENTERING THE BUFFER

TECHNICAL FIELD

The present disclosure relates generally to communication systems. More specifically, the present disclosure relates to systems and methods associated with an enhanced buffer status report (BSR) procedure by transmitting information indicative of packet arrival rate of data entering a transmit buffer.

BACKGROUND

Electronic devices often include wireless communications circuitry, and such electronic devices may be referred to as wireless terminals. For example, cellular telephones, computers, and other devices often contain antennas and wireless transceivers for supporting wireless communications. In 3GPP (The 3rd Generation Partnership Project) documentation, a wireless terminal, or wireless communication device, is commonly referred to as a User Equipment (UE). This term will be used herein but shall not be construed as being limited to operation under 3GPP specifications. A base station defines a cell and is operative to serve a surrounding area with radio access for UEs, by providing radio access to UEs within a cell. A base station may also be referred to as an access node, and various terms are used in 3GPP for different types of systems or specification. An access network, or Radio Access Network (RAN), typically includes a plurality of access nodes, and is connected to a Core Network (CN) which inter alia provides access to other communication networks. In the so-called 3G specifications, the term NodeB is used to denote an access node, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNB is used to denote an access node. In NR, communication may be configured in frequency bands well into the mm wave spectrum, such as around 28 GHz and above. In this spectrum, wireless terminals and base stations may configured for beamforming, whereby transmission and reception may be spatially focused to a beam which covers a certain direction and width or cone angle.

Many types of wireless terminals are most frequently used for reception of data from the wireless network, such as for streaming or downloading of data. However, for certain applications, uplink (UL) transmission of data is a primary feature. This may e.g. be related to live upload of streaming video data, as captured by a video camera device. Furthermore, it may also required to transmit high quality (e.g. High Definition, Ultra High Definition, 4K) video transmission and resulting in continuous, large packet size, and time-sensitive uplink transmission.

In legacy UL transmission, the UE is configured to transmit buffer status report (BSR) information first so that the network can allocate physical resource allocation, in a time/frequency resource grid, for the UL transmission from the UE. Typically, the UE can be configured to report BSR periodically. Once the network receives the BSR, the network will allocate the UL resources for the UE so that the UE can clear up its buffer. Any subsequent data for UL transmission provided in the UE after transmission of the BSR will be entered in the UE buffer and be transmitted later once the UE reports the subsequent BSR.

Recent development in wireless communication, providing for substantive UL transmission, poses a challenge for resource allocation. Specifically, improvements are needed for minimizing the risk of delay associated with UL transmission of latency-sensitive data.

SUMMARY

In view of these challenges, the present disclosure serves to provide solutions for controlling uplink transmission of data from a UE to a base station of a wireless network. The proposed solutions are outlined in the appended independent claims, whereas embodiments are set out in the dependent claims.

According to one aspect, a method carried out in a User Equipment, UE, is provided, for controlling uplink transmission of data to a base station of a wireless network, comprising:
 transmitting, to the base station, a buffer status report, BSR, indicative of a buffer data level value;
 transmitting, to the base station, information indicative of packet arrival rate of data entering the transmit buffer;
 receiving uplink resource information from the base station, in response to the BSR and said information; and
 transmitting data from the buffer using the received resource information.

The base station will thus be able to allocate UL resources to the UE based on the received BSR and information until the next BSR report. In addition to allocating resources based on the buffer data level value of the BSR, the base station may allocate further UL resources based on the received information. Hence, once the UE receives a new packet into the buffer, e.g. from an application, it can be transmitted without having to buffer the data for transmission based on a subsequent BSR. This way, packet delay is minimized.

BRIEF DESCRIPTION OF THE DRAWINGS

FIG. 2 schematically illustrates a UE configured to operate according to various embodiments.

FIG. 3 schematically illustrates a base station configured to operate according to various embodiments.

DETAILED DESCRIPTION

Figure 1:
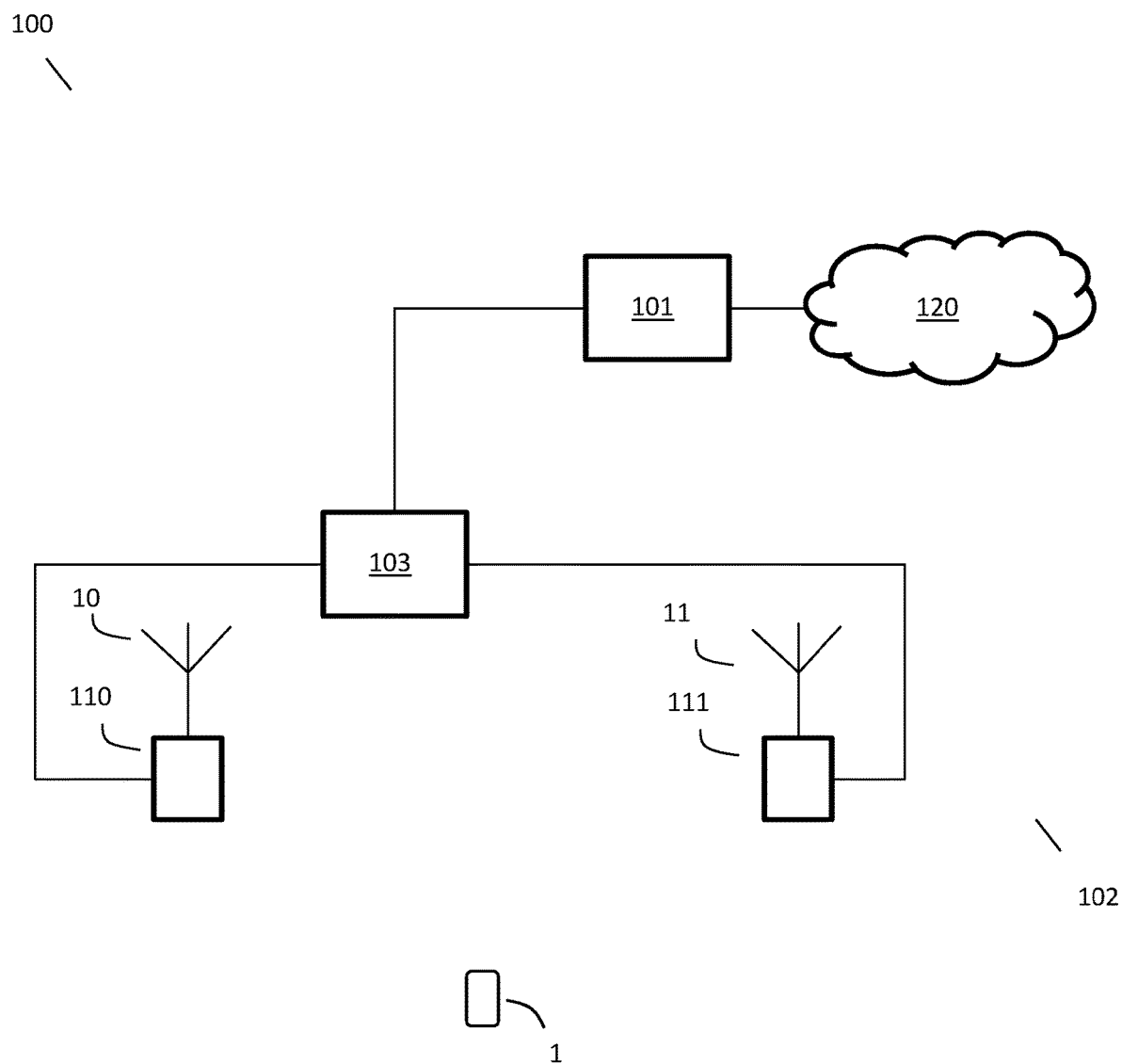
FIG. 1 schematically illustrates a wireless network and communication between a UE and various base stations according to various embodiments.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

FIG. 1 schematically illustrates a wireless communication system, providing an example of a scene in which the solutions provided herein may be incorporated. The wireless communication system includes a wireless network 100, and a UE (or terminal) 1 configured to wirelessly communicate with the wireless network 100. The wireless network may be a radio communication network operating under general and specific regulations and limits published by the 3GPP, such as a New Radio (NR) network. The wireless network 100 may include a core network 101, which is connected to other networks 120, such as the Internet. The wireless network 100 further includes an access network 102, which comprises a plurality of base stations or access nodes 110, 111. A base station is an entity executing the wireless connection with UEs. As such, each base station 110, 111 comprises or is connected to an antenna arrangement 10, 11 for transmitting and receiving radio signals. The actual point of transmission and reception of the base station may be referred to as a Transmission and Reception Point (TRP). The TRP may be seen as a network node which includes or is co-located with an antenna system 10, 11 of the base station 110, 111. The base station(s) 110, 111 may be a gNB and be configured for beamforming as introduced for 5G. The drawing further illustrates a network node 103, which may incorporate a function for managing communication with and cooperation of the base stations 110, 111, such as a user plane function. In various embodiments, a logical communication interface may be provided between the base stations 110, 111.

The UE 1 may be any device operable to wirelessly communicate with the network 100 through the base station 110, 111, such as a mobile telephone, computer, tablet, a M2M device or other. The UE 1 can be configured to communicate in more than one beam, which are preferably orthogonal in terms of coding and/or frequency division and/or time division. Configuration of beams in the UE 1 may be realized by using an antenna array configured to provide an anisotropic sensitivity profile to transmit radio signals in a particular transmit direction.

FIG. 2 schematically illustrates an embodiment of the UE 1 for use in a wireless network 100 as presented herein, and for carrying out the method steps as outlined.

The UE 1 may comprise a radio transceiver 213 for communicating with other entities of the radio communication network 100, such as the base stations 110, 111, in different frequency bands. The transceiver 213 may thus include a radio receiver and transmitter for communicating through at least an air interface.

The UE 1 further comprises logic 210 configured to communicate data, via the radio transceiver, on a radio channel, to the wireless communication network 100 and possibly directly with another terminal by Device-to Device (D2D) communication.

The logic 210 may include a processing device 211, including one or multiple processors, microprocessors, data processors, co-processors, and/or some other type of component that interprets and/or executes instructions and/or data. Processing device 211 may be implemented as hardware (e.g., a microprocessor, etc.) or a combination of hardware and software (e.g., a system-on-chip (SoC), an application-specific integrated circuit (ASIC), etc.). The processing device 211 may be configured to perform one or multiple operations based on an operating system and/or various applications or programs.

The logic 210 may further include memory storage 212, which may include one or multiple memories and/or one or multiple other types of storage mediums. For example, memory storage 212 may include a random access memory (RAM), a dynamic random access memory (DRAM), a cache, a read only memory (ROM), a programmable read only memory (PROM), flash memory, and/or some other type of memory. Memory storage 212 may include a hard disk (e.g., a magnetic disk, an optical disk, a magneto-optic disk, a solid state disk, etc.).

The memory storage 212 is configured for holding computer program code, which may be executed by the processing device 211, wherein the logic 210 is configured to control the UE 1 to carry out any of the method steps as provided herein. Software defined by said computer program code may include an application or a program that provides a function and/or a process. The software may include device firmware, an operating system (OS), or a variety of applications that may execute in the logic 210.

The UE 1 may further comprise an antenna 214, which may include an antenna array. The logic 210 may further be configured to control the radio transceiver to employ an anisotropic sensitivity profile of the antenna array to transmit radio signals in a particular transmit direction. In various embodiments, this may involve applying a transmit spatial filter 215A for adapting inter alia the spatial sensitivity of the antenna 214 in UL transmission, and a receive spatial filter 215B for adapting inter alia the spatial sensitivity of the antenna 214 in DL reception. Dependent on implementation, the spatial filters 215A, 215B may comprise plural groups of phase shifters, which may be independent.

The UE 1 further implements a buffer 216, which may receive data from a unit or from an application operated in the UE 1, for UL transmission using the transceiver 213. The logic 210 is configured to send BSR, reflecting a status of the buffer 216 regarding at least a level of data present in the buffer 216, to the wireless network 100.

Obviously, the terminal may include other features and elements than those shown in the drawing or described herein, such as a power supply, a casing, a user interface, one or more sensors, and a unit configured to provide data to the buffer, e.g. a video camera, etc. Moreover, additional levels of buffers may be implemented in the terminal. When reference is made herein to the buffer 216, this may be a buffer for data available in a communication modem of the terminal, while additional buffers and memories may reside in other functions of the terminal. For example, a video or image capturing device within the terminal or coupled to an application residing in the terminal may store data in one or more buffers in addition to the buffer 216 available for the lower layer modem signaling coupled to resource allocations for wireless transmissions.

FIG. 3 schematically illustrates a base station 110 for use in a radio communication network 100 as presented herein, and for carrying out the method steps as outlined herein. It shall be noted that the embodiment of FIG. 3 may equally well be used for the second base station 111.

The base station 110 includes or operates as a base station of a radio communication network 100, such as a gNB. The base station 110 may comprise a radio transceiver 313 for wireless communicating with other entities of the radio communication network 100, such as the UE 1. The transceiver 313 may thus include a radio receiver and transmitter for communicating through at least an air interface.

The base station 110 further comprises logic 310 configured to communicate data, via the radio transceiver, on a radio channel, with UE 1. The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the base station 110 to carry out any of the method steps as provided herein. Software defined by said computer program code may include an application or a program that provides a function and/or a process. The software may include device firmware, an operating system (OS), or a variety of applications that may execute in the logic 310.

The base station 110 may further comprise or be connected to an antenna 314, connected to the radio transceiver 313, which antenna may include an antenna array. The logic 310 may further be configured to control the radio transceiver to employ an anisotropic sensitivity profile of the antenna array to transmit and/or receive radio signals in a particular transmit direction. In various embodiments, this may involve applying a transmit spatial filter 315A for adapting inter alia the spatial sensitivity of the antenna 314 in DL transmission, and a receive spatial filter 315B for adapting inter alia the spatial sensitivity of the antenna 314 in UL reception. The base station 110, or alternatively only the antenna 314, may form a transmission point TRP for the base station 110.

The base station 110 may further comprise a communication interface 316, operable for the base station 110 to communicate with other nodes of the wireless network 100, such as a higher network node 103 or with another base station 111.

The logic 310 is configured to determine allocation of resources to UEs operating within the cell of the base station 110, based on inter alia BSR received from such UEs, and to transmit information of resource allocation to the UEs.

In various embodiments, the base station 110 is configured to carry out the method steps described for execution in a base station as outlined herein.

Various embodiments will now be described with reference to the drawings.

Figure 4:
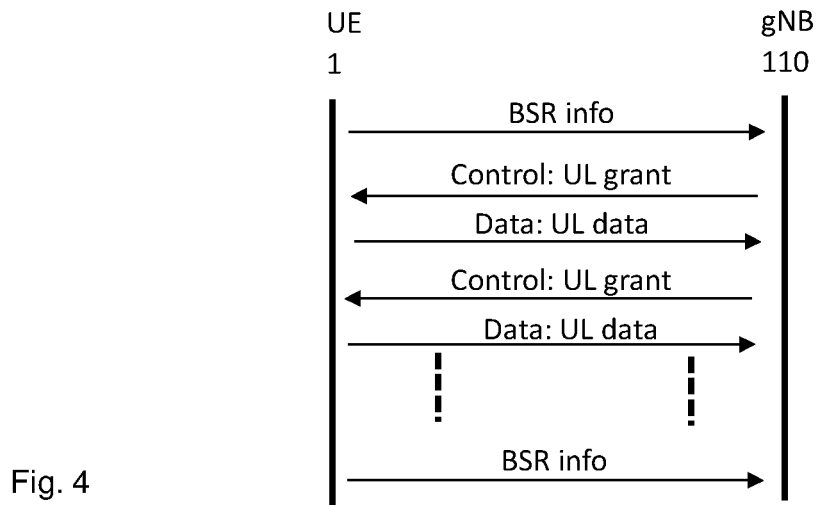
FIG. 4 schematically illustrates general communication related to buffer status reporting between a UE and a base station.

FIG. 4 schematically illustrates BSR and UL transmission on a general level. The UE 1 transmits BSR information to a connected base station 110, preferably periodically at regular intervals. In legacy system, the BSR periodicity is within 10 ms and 1 sec. Once the network receives BSR, the base station 110 will allocate UL resources for the UE 1 so that the UE 1 can clear up its buffer 216.

(BSR in NR is presently described in 3GPP document TS 38.321. The process is almost similar to LTE where the UE only report the buffer size status. The specification defines Table 1 as shown below, where it is defined what index is reported for a certain level of data buffer size (BS value) present in the buffer 216:

TABLE 1

Table 6.1.3.1-1: Buffer size levels (in bytes) for 5-bit Buffer Size field

| Index | BS value |
|---|---|
| 0 | 0 |
| 1 | ≤10 |

TABLE 1-continued

Table 6.1.3.1-1: Buffer size levels (in bytes) for 5-bit Buffer Size field

| Index | BS value |
|---|---|
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

Placing the UL payload into a buffer 216 can increase packet delay, and the applicant has discovered that this may cause problems. Tests run by the applicant have indicated that the delay may be problematic for at least certain applications where latency is critical, such as UL transmission of video data for immediate, or live, rendering and presentation. The following is an example obtained from applicant's measurements:

The scenario is uplink streaming transmission with 40 Mbps, packet size=1 KB, traffic rate=5 packets/ms.

The gNB is configured with bandwidth (BW)=100 MHz, band=n78 (with 30 khz sub-carrier spacing (SCS)), TDD with 4 DL:1 UL, periodic BSR=10 ms, max cell rate-86 Mbps.

This configuration results in: 40 Mbit/s=5 MByte/s=50 KB/10 ms (50 KB/BSR period). This means that the UE 1 receives ~50 KB of data to its buffer 216 during each BSR period. The data may e.g. be received from an application or unit for providing video data.

Since data traffic arriving in the buffer 216 between BSRs is not scheduled by the base station 110, the buffer 216 will be kept at ~50 KB. Subsequently, the UE will report BSR index 27, sometimes index 26 as referred to in Table 1.

Figure 5:
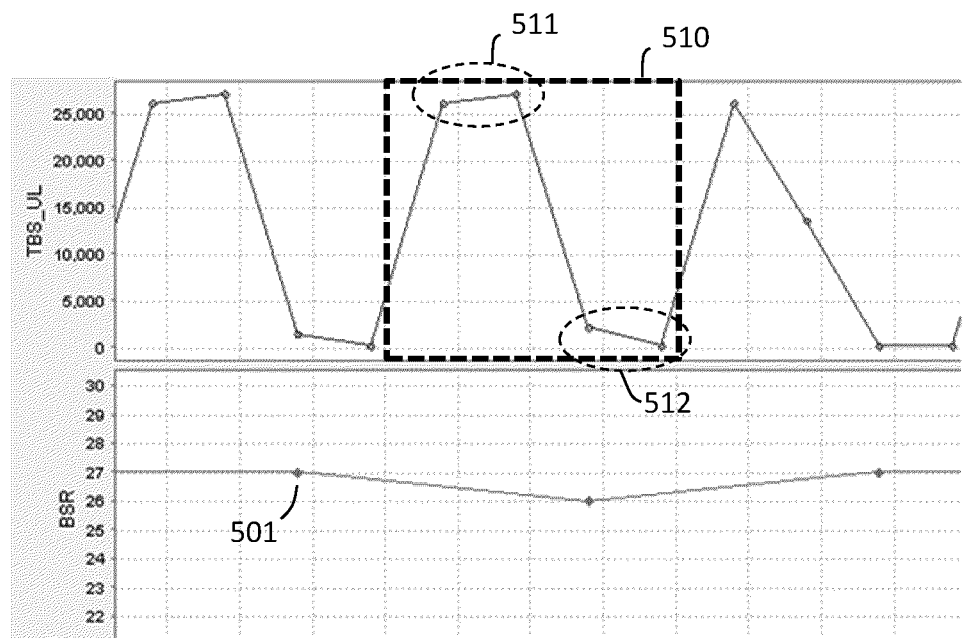
FIG. 5 illustrates emptying of a transmit buffer based on BSR.

FIG. 5 illustrates the resulting resource configuration (i.e. Transport Block Size (TBS) for uplink transmission) for the UE in the upper part of the diagram, wherein BSR instances are indicated in the lower part. One BSR 501 is provided by the UE 1 and transmitted as BSR information to the base station 110. In this example, the UE 1 sends BSR=27 (≤55 474 Bytes). The UE 1 will in return receive control data including the corresponding UL grant from the base station 110, with scheduled resource allocation in a subsequent window 510 representing an allocation period. It can be observed that the gNB base station 110 tries to clear up the buffer 216 by selecting higher Modulation and Coding Scheme (MCS)/Transport Block Size (TBS) for the first few transmissions 511 after the BSR, by allocation for 55 441 Bytes. In this case, there are two instances where the allocated TBS are relatively big at more than 25000 bits. The MCS/TBS will then drop as the UE buffer 216 is empty, as illustrated at 512. No allocation is made for additional incoming traffic after the BSR 501, and any new arrival packet will be buffered and wait for the next BSR report. (It may be seen that in the next BSR cycle a BSR=26 (≤39 818 Bytes) is transmitted, hence only one UL transmission occasion is required).

In this scenario, the statistic of uplink delay shows an average of 14.9 ms, and a maximum delay of 20 ms. As noted by the applicant, this delay may cause unacceptable results for some applications, although NR supports ultra-reliable low-latency communication (URLLC) services which has a very stringent latency requirement.

A solution is provided herein for minimizing the possible long packet delay, by means of a function for allocating UL resources to the UE even if the UE buffer 216 as reported in BSR is already emptied. This is achieved by introducing some new UE assistance parameters & signaling between UE 1 and wireless network 100, such as specifically the serving base station 110. In various embodiments, this is obtained by providing packet arrival rate information to the base station 110, reflecting incoming arrival/traffic rate of packets entering the UE transmit buffer 216. The packet arrival rate may e.g. be given by a value of data amount per time unit, such as Mb/s or other suitable unit, or number of packets per time unit, where the packet may correspond to a certain data amount or a certain maximum data amount.

Figure 6:
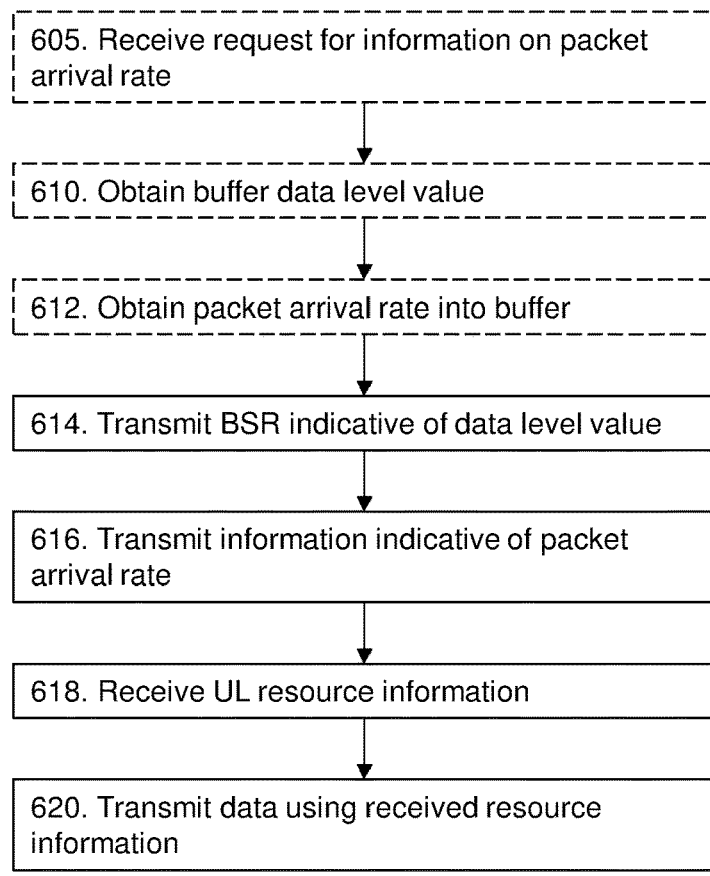
FIG. 6 schematically illustrates a flow chart of a method carried out in a UE according to various embodiments.

FIG. 6 schematically illustrates a flow chart of this solution, which provides a method carried out in the UE 1 for controlling UL transmission of data to the base station 110 of the wireless network 100. The method comprises:

transmitting 614, to the base station 110, a BSR indicative of a buffer data level value;

transmitting 616, to the base station 110, information indicative of packet arrival rate of data entering the transmit buffer 216;

receiving 618 UL resource information from the base station 110, in response to the BSR and said information; and transmitting 620 data from the buffer 216 using the received resource information.

Figure 7:
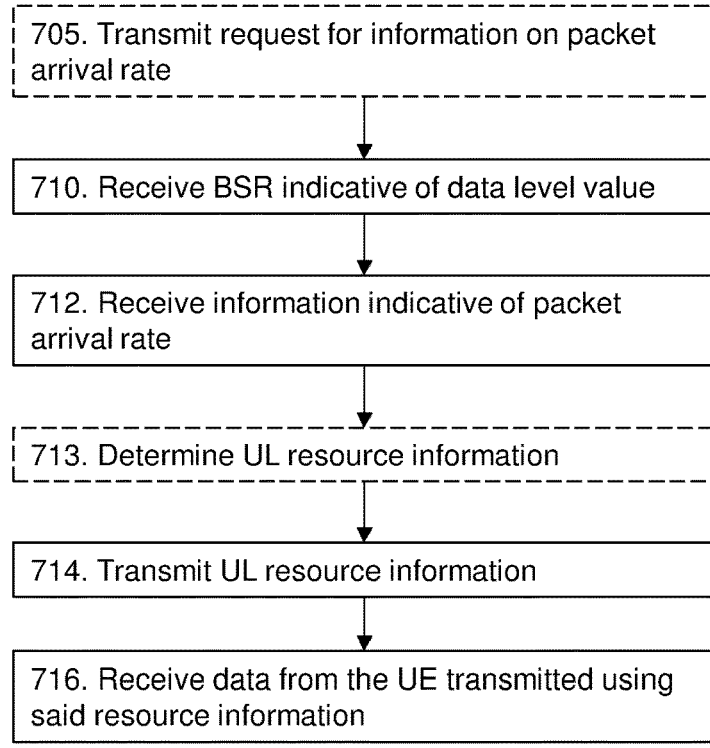
FIG. 7 schematically illustrates a flow chart of a method carried out in a base station according to various embodiments.

FIG. 7 schematically illustrates a flow chart of the proposed solution, from the network perspective. Herein, a method is provided which is carried out in the base station 110 of the wireless network 100 for controlling UL transmission of data from the UE. The method comprises:

receiving 710, from the UE 1, a BSR indicative of a data level value of a transmit buffer 216 of the UE 1;

receiving 712, from the UE 1, information indicative of packet arrival rate of data entering the transmit buffer 216;

transmitting 714, to the UE 1, UL resource information allocated in response to the BSR and said information; and receiving 716 data from the UE, transmitted in the UL using said resource information.

As provided in these two aspects of the proposed general solution, the base station 110 will allocate UL resources to the UE 1 based on the received BSR and information until the next BSR report. In addition to allocating resources based on the buffer data level value of the BSR, the base station may allocate further UL resources based on data expected to enter the buffer based on the information indicative of the packet arrival rate. Therefore, once the UE 1 receives a new packet into the buffer 216, e.g. from an application, it can be transmitted using the allocated resources without having to buffer the data for transmission based on a subsequent BSR. This way, packet delay is minimized.

Figure 8:
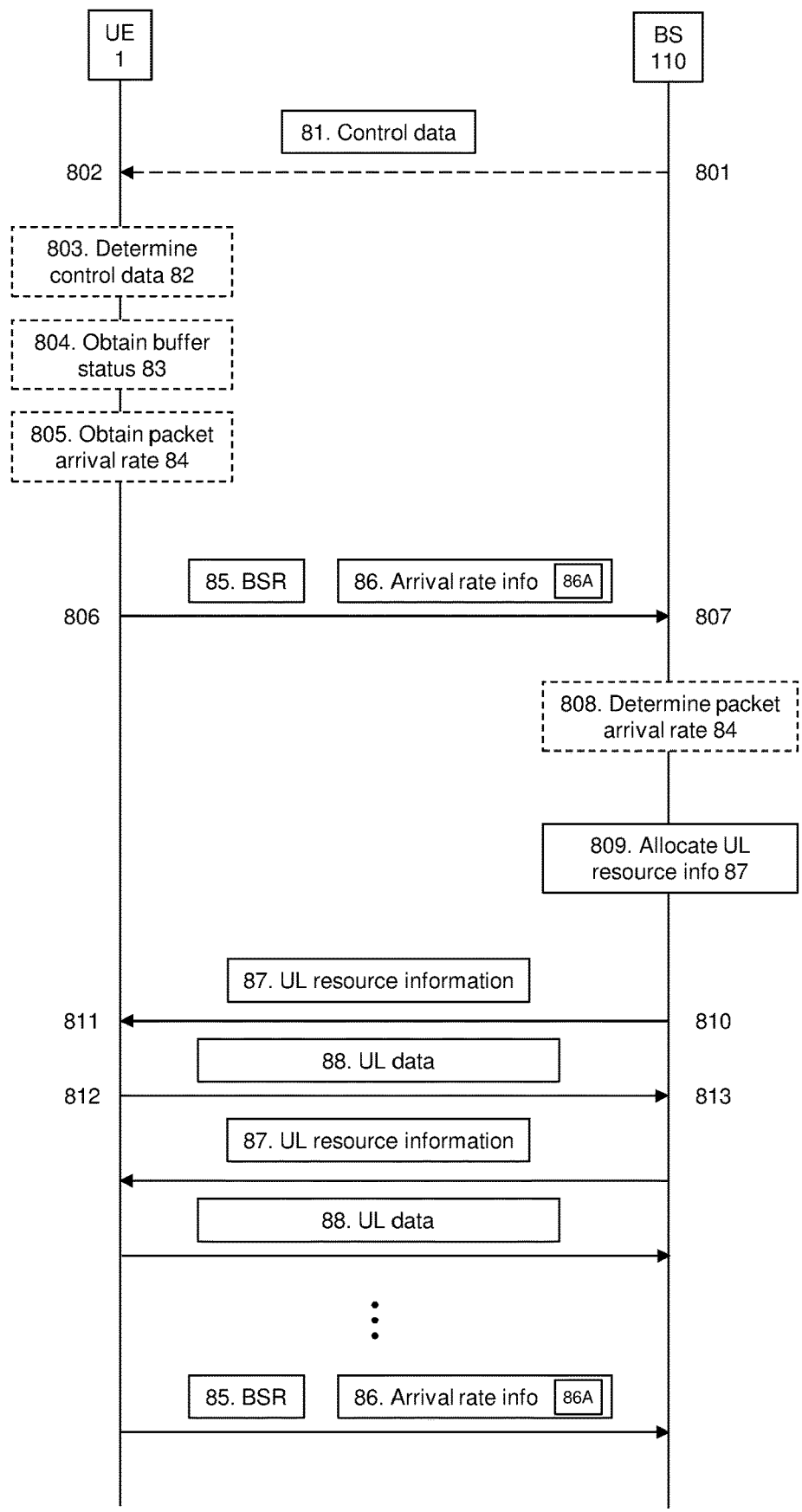
FIG. 8 schematically illustrates a signaling diagram between a base station of a wireless network and a UE for enhanced buffer state reporting according to various embodiments.

FIG. 8 shows a signaling diagram including embodiments falling under the scope of the general solutions provided above. Various embodiments and alternative detailed solutions associated with the general solutions will now be discussed, while also referring to FIG. 8, and measurement results provided in FIG. 9-12.

Figure 9A:
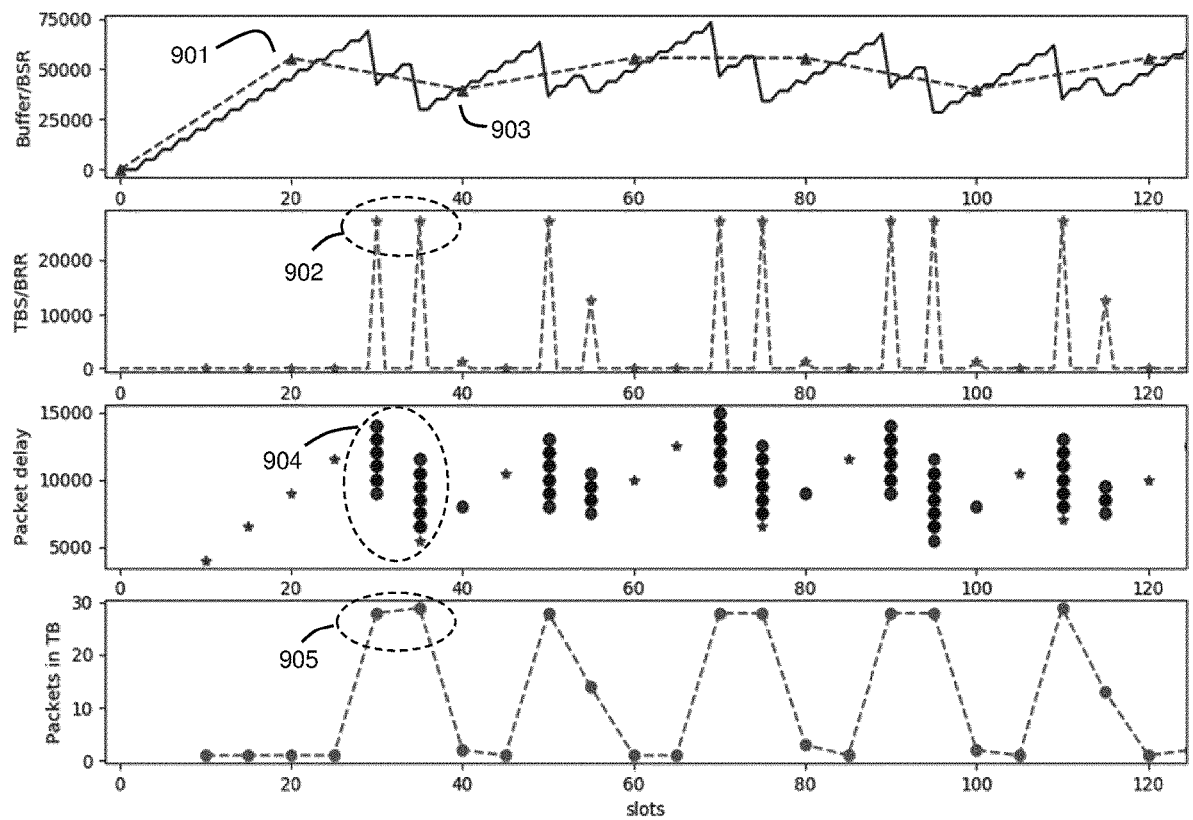
FIG. 9 illustrate measurement results related to BSR using a prior art method.
Figure 9B:
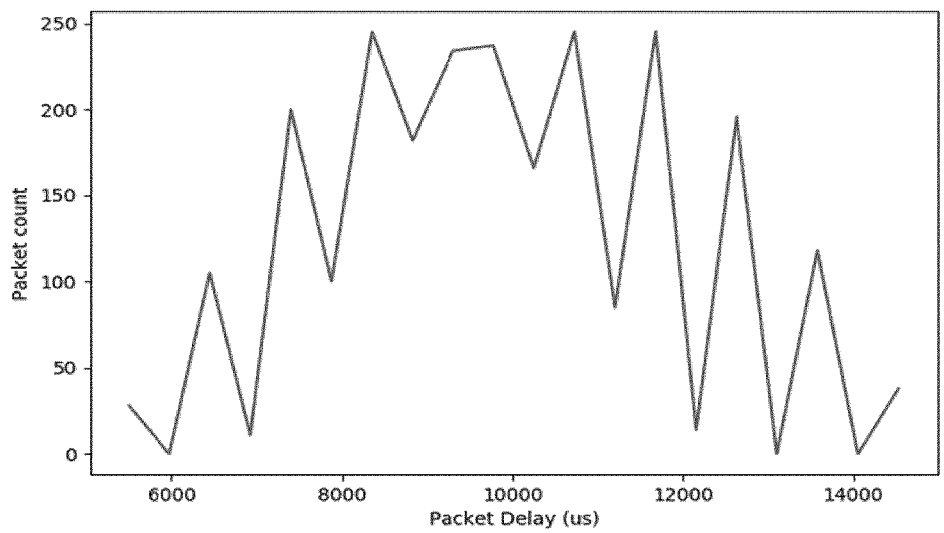

Before discussing further details, and for reasons of comparison, FIGS. 9A and 9B illustrate data buffering and transmission, and the resulting packet delay, for a UE operating under legacy solutions. From the top diagram of FIG. 9A, the buffer level is indicated by the full line. Packets are arriving at the UE at a constant rate, therefore increasing the allocated buffer size. At a BSR 901, the level of the buffer is reported. In response thereto, and for the next UL allocation period (corresponding to 510), the base station allocates UL resources and informs the UE. Specifically, the base station seeks to empty the buffer, and subsequently the UE makes use of the allocated resources in UL occasions 902. This is also reflected as a drop in the buffer level in the top diagram. Each UL allocation is large enough to carry a high number of packets, as indicated in 905. Each of these packets will have an associated delay, corresponding to its buffering time, as indicated in 904. Buffered packets may need to be segmented in order to fully utilize the UL allocation size. If segmented, packet delay is only measured when the last segment is received. Segments are represented by a star, while full packet and last segment are indicated by a full circle. No resource allocation is provided for further UL occasions in that BSR period. However, as it can be seen from the top diagram, the buffer continues to fill up during the period until the subsequent BSR occasion 903. FIG. 9B illustrates the resulting packet delay.

Returning to FIG. 8 and the solutions proposed herein for minimizing packet delay, this involves providing an indication to the base station 110 of packet arrival rate in the UE buffer 216.

In some embodiments, information 86 indicative of packet arrival rate 84 is transmitted 616, 806 in or together with the transmission 614, 806 of the BSR 85. In various embodiments, this entails transmitting 614, 616, 806 the BSR 85 and the information 86 indicative of packet arrival rate within the same Medium Access Control-Control Element (MAC CE). In one embodiment, packet arrival rate information 86 can thus be embedded together with the BSR 85. This may entail including the packet arrival rate information 86 as extended information in a message including the BSR 85, or as a message sent consecutively with the BSR. Hence, there can be two types of BSR: BSR_type1 (legacy) and BSR_type2 (new, with indication of packet arrival rate). In alternative embodiments, the information 86 indicative of packet arrival rate is transmitted 616, 806 as a separate message, either prior to or after the transmission 614 of the BSR 85.

The data level value 83 of the transmit buffer 216 may be obtained 610, 804 from a function controlling the buffer 216 in the UE 1, and this obtainment may e.g. be carried out according to any state of the art method used in conjunction with a transmit buffer 216.

In some embodiments, the packet arrival rate 84 is determined at a point in time between transmission 616 of said BSR 85 and a preceding BSR. Alternatively, the packet arrival rate 84 is determined concurrently with obtaining 804 the data level value 83, e.g. by obtaining 804, 805 both the data level value 83 of the transmit buffer 216 and the packet arrival rate 84 from a UE function (not shown) controlling the transmit buffer 216.

In some embodiments, the packet arrival rate 84 is determined once for a BSR period and used as valid until the next occasion of determining the packet arrival rate 84 for the subsequent BSR period. Alternatively, a determined packet arrival rate 84 is used as valid for a number of subsequent BSR periods. In such an embodiment, new information 86 indicative of the packet arrival rate 84 is transmitted 616, 806 only when a new packet arrival rate 84 has been obtained 612, 805, or e.g. a flag or code may be transmitted 616, 806 to indicate unchanged packet arrival rate until a new value is obtained 612, 805. The packet arrival rate 84 may be determined by estimation or calculation, based on e.g. a number of packets received in the buffer 216 within a certain window, such as the preceding BSR period or a shorter or longer time frame. In other embodiments, the packet arrival rate may be determined at least partly based on the type of data or the type of application or function providing the data to the buffer, e.g. video data provided by an application for video recording. The determination of the packet arrival rate may thus at be carried out by calculation in an upper layer, e.g. application layer, from which the logic 210 may obtain 805 the packet arrival rate in e.g. the MAC layer where BSR is performed.

In some embodiments, the information 86 indicative of packet arrival rate is selectively transmitted 616, 806 based on BSR control data 81, 82. The BSR control data 81, 82 may, as outlined above, be dependent on an application providing data to the buffer 216. In some embodiments, the BSR control data 81, 82 may be dependent on a Quality of Service, QoS, requirement or QoS Flow ID (QFI).

In some embodiments, the BSR control data 82 may be determined 803 by the UE 1, e.g. dependent on the type of application supplying data to the buffer 216, or a determined QoS requirement or QFI. In an alternative embodiment, the BSR control data 81 is transmitted 705, 801 from the base station 110 for receipt 605, 802 in the UE 1. This way, the UE 1 is configured to provide the information 86 indicative of packet arrival rate based on an obtained base station request, which request forms said control data 81. Such BSR control data 81 may e.g. be transmitted 705, 801 based on the application providing data to the buffer or a QoS requirement. Alternatively, a control function (not shown) determining a quality of rendering the data, such as rendering of video data, may provide the control data based on a determined quality or delay associated with the rendering, which control data 81 is thus obtained in the base station 110, e.g. from a data rendering device (not shown) such as a display function, for transmission 705 to the UE 1.

In some embodiments, the information 86 indicative of packet arrival rate comprises packet arrival rate measured by the UE, such as a data value.

Figure 10A:
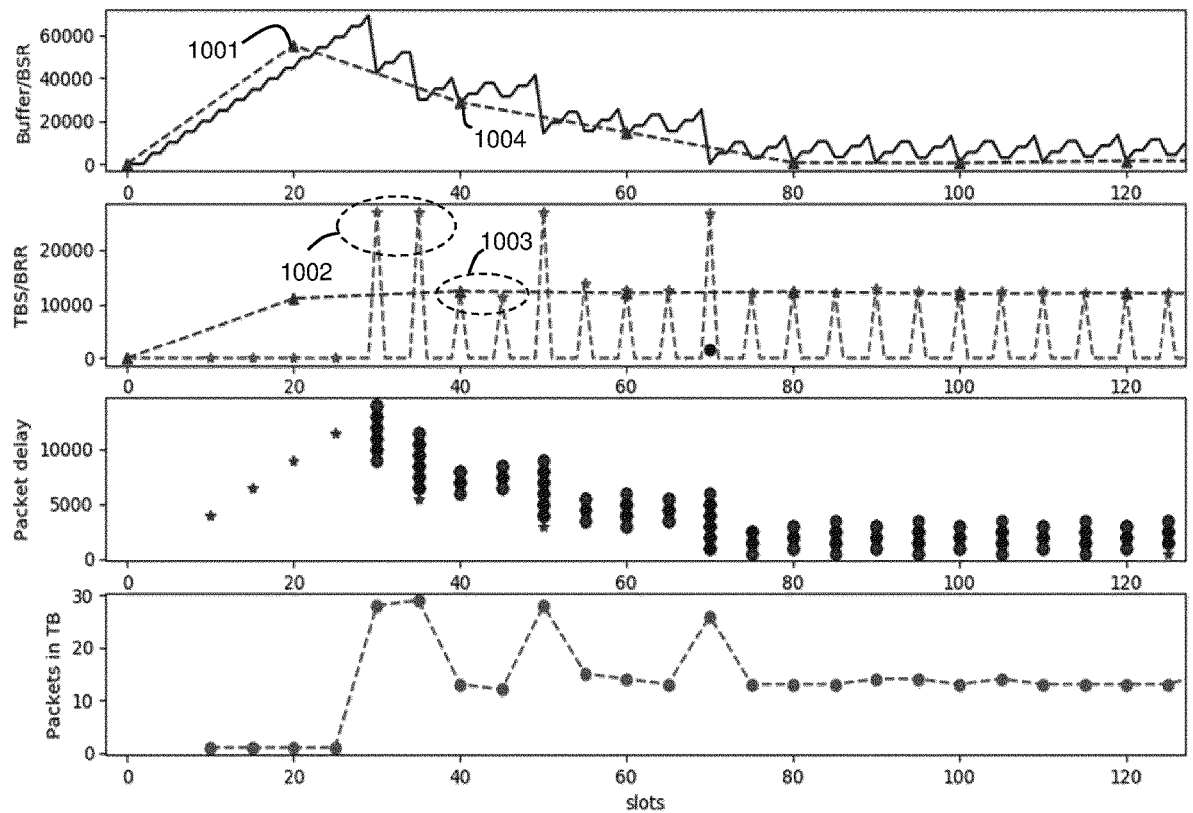
FIG. 10 illustrate measurement results related to BSR of using an embodiment as outlined herein.

FIG. 10 shows diagrams corresponding to the legacy solution of FIG. 9, but where the base station is provided with a measured value of packet arrival rate 84. From the top diagram of FIG. 10A, the buffer level is indicated by the full line. At a BSR occasion 1001, the level of the buffer is reported by the UE 1. In addition, information 86 indicative of packet arrival rate is provided by the UE 1, in this example by means of a measured or estimated value, e.g. an exact value. In response thereto, the base station 110 allocates UL resources and informs the UE 1. The base station 110 is configured to seek to empty the buffer 126 at the earliest possible opportunity and allocates resources for use at UL occasions 1002 for this purpose. Moreover, based on the information 86, further resources are allocated and scheduled for subsequent UL occasions 1003 within the same BSR period, prior to the next BSR 1004. In this example, the base station is configured to allocate an even amount of resources for each occasions of 1003 for data estimated to enter the buffer based on the information 86, following the first occasions 1002 serving to empty the buffer based on the BSR 85. In an alternative embodiment, a reducing amount of resources may be scheduled for each UL occasion in the period of 1003.

Figure 10B:
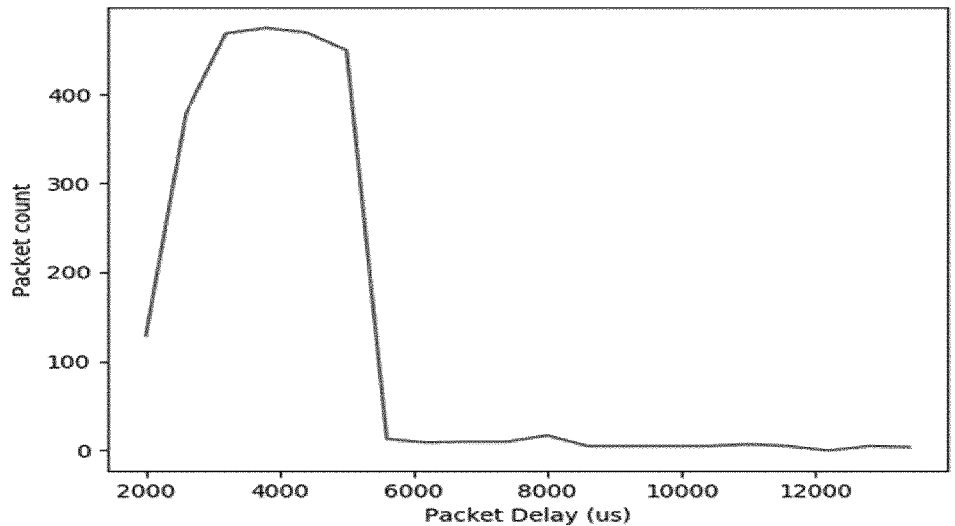

FIG. 10B illustrates the resulting packet count versus packet delay, and as can be seen there is a distinctive improvement in terms of both maximum and average delay. It may be noted that the tail in the diagram of FIG. 10B is a result of packets entering the buffer after the first BSR, when there is no prior information 86 indicative of packet arrival rate to report.

In other embodiments, the information 86 indicative of packet arrival rate is predefined, e.g. in a form of look-up table, in order to minimize the size of the information to transmit. The information 86 indicative of packet arrival rate may thus comprise a data value representing a quantized arrival rate level 84. This serves the purpose of saving the amount of data 86 to be reported, such as limiting the number of bits required to indicate the level of the packet arrival rate 84, e.g. number of packets/time unit or number of packets*packet size/time.

In one embodiment, the packet arrival rate 84 is quantized with the actual number, e.g. as indicated by the example of Table 2 below. The unit used for quantizing the information 86 may e.g. be KB/msec, as indicated in Table 2, or KB/BSR-rep-interval.

TABLE 2

| Packet arrival rate-report | Size |
|---|---|
| 000 | 0 (no report) |
| 001 | ≤10 KB/msec |
| 010 | ≤30 KB/msec |
| 011 | ≤50 KB/msec |
| 100 | ≤100 KB/msec |
| 101 | ≤300 KB/msec |
| 110 | ≤500 KB/msec |
| 111 | >500 KB/msec |

Figure 11A:
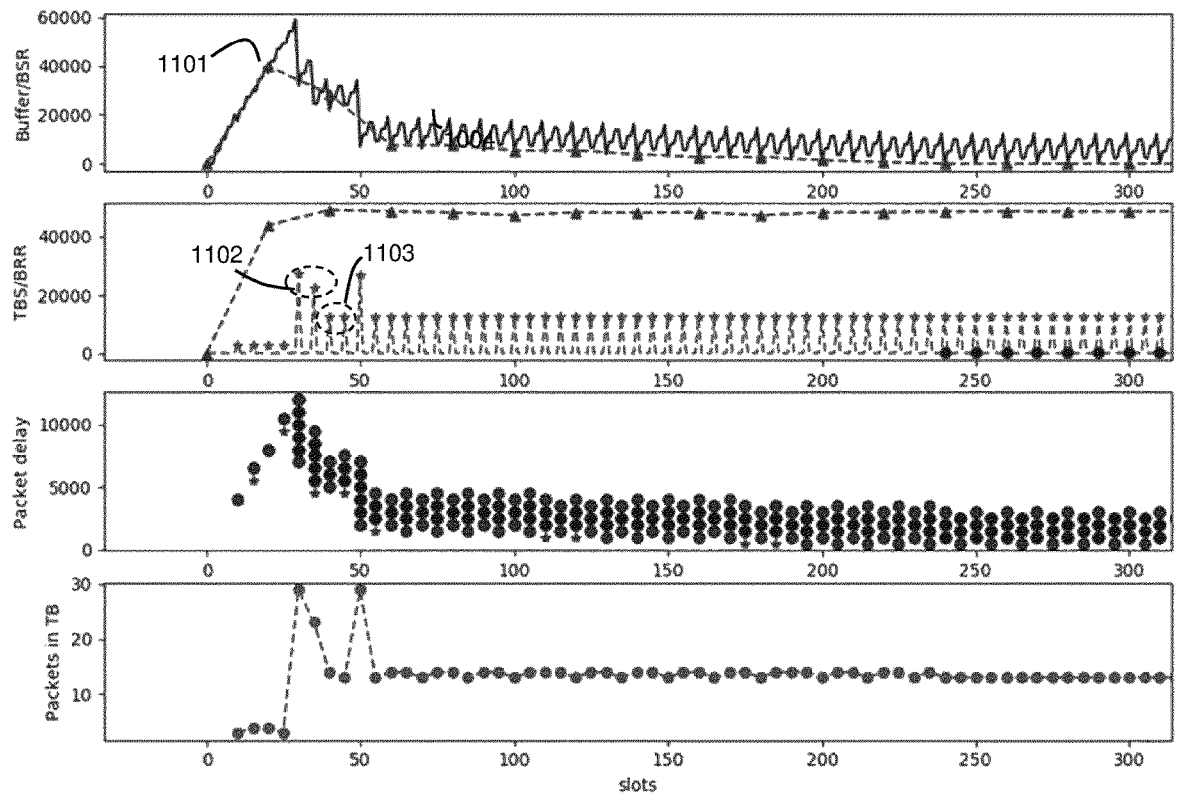
FIG. 11 illustrate measurement results related to BSR of using an embodiment as outlined herein FIG. 12 illustrate measurement results related to BSR of using an embodiment as outlined herein.

FIG. 11 shows diagrams corresponding to the embodiment of FIG. 10, but where the base station is provided with a quantized value of packet arrival rate 84. From the top diagram of FIG. 10A, the buffer level is indicated by the full line. At a BSR occasion 1101, the level of the buffer is reported by the UE 1. In addition, information 86 indicative of packet arrival rate is provided by the UE 1, in this example by means of a quantized value as provided in the example of Table 2. In response thereto, the base station 110 allocates UL resources and informs the UE 1. The base station 110 is configured to seek to empty the buffer 126 at the earliest possible opportunity and allocates resources for use at UL occasions 1102 for this purpose. Moreover, based on the information 86, further resources are allocated and scheduled for subsequent UL occasions 1103 within the same BSR period, prior to the next BSR 1004. In this example, the base station is configured to allocate an even amount of resources for each occasions of 1103 for data estimated to enter the buffer based on the information 86, following the first occasions 1102 serving to empty the buffer based on the BSR 85. In an alternative embodiment, a reducing amount of resources may be scheduled for each UL occasion in the period of 1103.

Figure 11B:
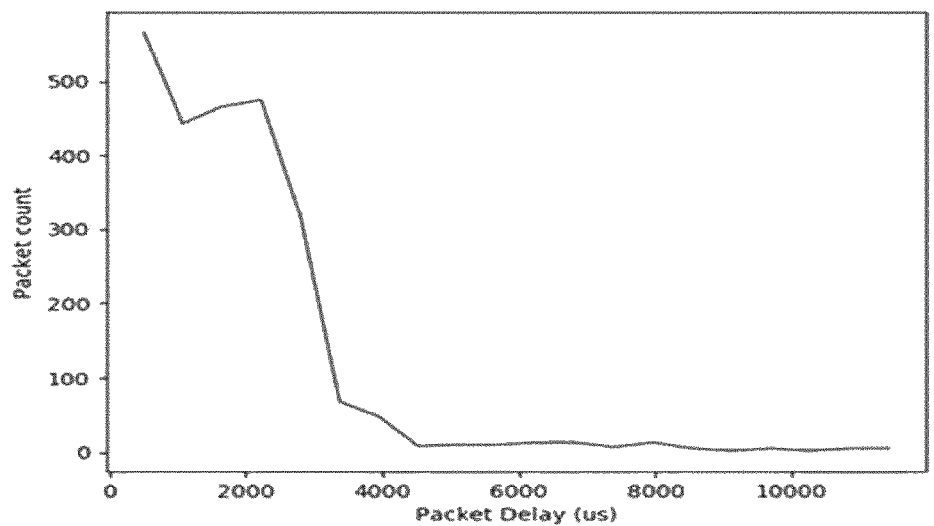

FIG. 11B illustrates the resulting packet delay, which provides further improvement over the prior art, and also over the embodiment of FIG. 10 in terms of both maximum and average delay. The reason for this is due to the quantizing: for any value of obtained packet arrival rate 84, an indication representing the upper limit (of the second column of Table 2) will be determined and the corresponding indication 86 (comprising the corresponding value from the first column of Table 2) is transmitted to the base station 110. The tail in the diagram of FIG. 11B is caused by the same effects as for FIG. 10B.

In an alternative embodiment, a relative representation is used, as indicated in Table 3 below. This method means that the information 86 indicative of the packet arrival rate may be even smaller, in terms of bits. It may be up to the base station 110 to determine what limits in terms of arrival rate to associate with each level, or it may alternatively be provided by means of specification.

TABLE 3

| Packet arrival rate-report | Type |
|---|---|
| 00 | Nothing to report |
| 01 | Slow |
| 10 | Medium |
| 11 | Fast |

In some embodiments, the information 86 indicative of packet arrival rate comprises a flag indicating delay sensitive packet transmission. The flag may be realized as a one bit value, such as 1 or 0 in binary code. In such an embodiment, there is no explicit packet arrival rate signaling, indicating a certain packet arrival rate. Instead, the UE 1 indicates that it may have delay sensitive packet, e.g. by means of the one bit signaling. The packet arrival rate may be determined 808 in the base station 110 by calculation, if needed, as function of buffer-size (BS) value and/or the periodicity of BSR report (phr-PeriodicTimer). For example: max(BS_Value)/phr-PeriodicTimer. If BSR Index 27, and BSR periodicity is 10 msec, then 55474/10, and the rate 84 would be around 5K/msec.

In some embodiments, the information 86 indicative of packet arrival rate comprises a time distribution indicator 86A, associated with data in the buffer. This way, the UE 1 can, in addition to the packet arrival rate, provide assistance information on how packets are distributed between two BSR occasions. In legacy operation, the gNB is typically configured to clear up the UE buffer by allocating large resources in the beginning of the allocation, as outlined. The assistance information provided by the time distribution indicator 86A may be configured to indicate one of a number of selectable options, e.g. by providing a value of one or more bits. Various options may be:

Type I: Empty the buffer using first resource level and continue allocation with a second resource level, which is lower than the first resource level. This corresponds to the method implemented in the examples provided in FIGS. 10 and 11. This way the base station 110 tries to clear up the UE buffer first, i.e. by allocating large TB size (as in the legacy method), and continues giving resource allocation after that in the time window for UL transmission associated with the BSR period.

Type II: Distributed. This way the base station 110 may be configured to distribute the resource allocation for the UL transmission of the UE buffer 126 and any subsequent data entering the buffer determined based on the information 86 indicative of packet arrival rate. This may in one embodiment involve allocating mid-size TB size for each UL occasion in the BSR period until the next BSR.

Type III: Backwards allocation. This may be seen as a variant of Type II. Based on the BSR 85 and the information 86 indicative of packet arrival rate, resources may be specifically be allocated at the end of the BSR period. For example, large TB size may be allocated in the beginning of the BSR period, if the BSR 85 indicates a high buffer data level, whereas one or more UL occasions may be allocated counted from the end of the BSR period based on the amount of data expected to enter the buffer in the BSR period, based on the information 86 indicative of packet arrival rate. In one variant of this embodiment, a high packet arrival rate indicated by the information 86 may result in UL occasions being allocated from the end of the time window of the BSR period, while no resource allocation is provided for the first UL occasions due to the BSR 85 indicating a low level of data present in the buffer 126.

Figure 12A:
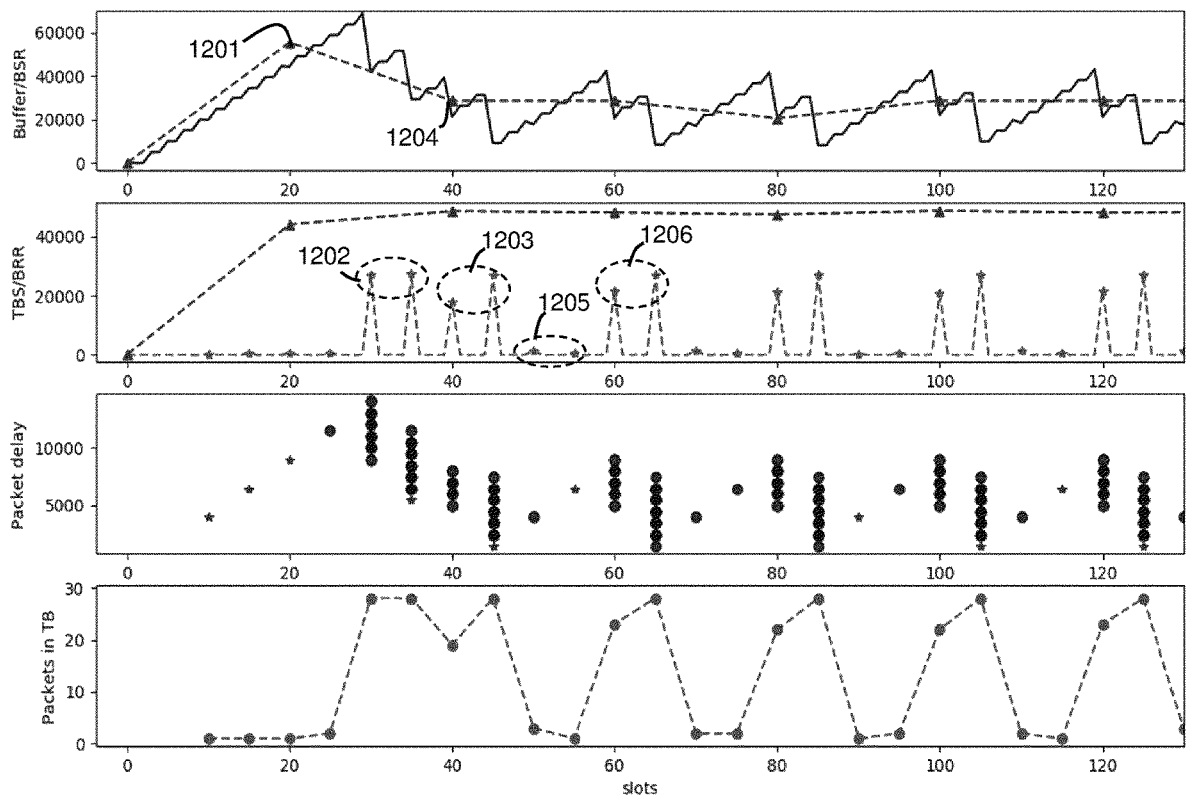

FIG. 12 shows diagrams corresponding to the embodiment of FIGS. 10 and 11, but where the base station is configured to allocate resources in accordance with the Type III method indicated above. From the top diagram of FIG. 10A, the buffer level is indicated by the full line. At a BSR occasion 1201, the level of the buffer is reported by the UE 1. In addition, information 86 indicative of packet arrival rate is provided by the UE 1, e.g. by means of a quantized value, a relative value or a real value. In response thereto, the base station 110 allocates UL resources and informs the UE 1. Due to the high buffer level, the base station 110 is configured to seek to empty the buffer 126 at the earliest possible opportunity and allocates resources for use at UL occasions 1202 for this purpose. Moreover, based on the information 86, further resources are allocated and scheduled for subsequent UL occasions 1203 within the same BSR period, prior to the next BSR 1004. These occasions are scheduled at the end of the period in this embodiment, and for this reason a larger TB is allocated at the last occasion. In the next BSR 1204, the buffer level of the transmit buffer 126 is lower than at the first BSR 1201, but the packet arrival rate is about the same. Based on the buffer indicated by the BSR 85, e.g. with regard to a threshold level, the base station 110 will not allocate any initial resources for UL transmission at the beginning 1205 of the associated following period. However, based on the information 86 obtained in or with the BSR 85, resources are allocated and scheduled for subsequent UL occasions 1206 at the end of the period.

Figure 12B:
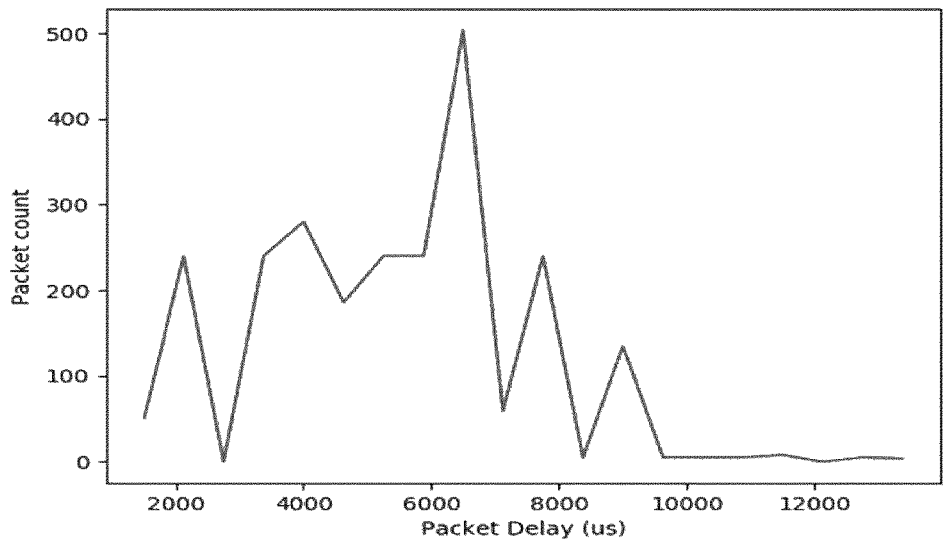

FIG. 12B illustrates the resulting packet count versus packet delay, showing that the maximum and average packet delay is improved over the prior art legacy method. For the specific scenario of packet arrival rate, this embodiment does not provide an improvement of the embodiments outlined with reference to FIGS. 10 and 11. However, in a scenario in which the logic 210 of the UE 1 is aware of the packet arrival distribution, accurately or approximately, from an application supplying the data, this embodiment may be the most efficient in terms of at least average delay. Based on such knowledge, as obtained e.g. from the application, the UE 1 may be configured to selectively transmit an associated time distribution indicator 86A to the base station 110. The tail in the diagram of FIG. 12B is caused by the same effects as for FIG. 10B.

In some embodiments, the UE 1 may be arranged to transmit a predetermined bit pattern, e.g. in the UL data, to indicate to the base station 110 that the UE 1 has nothing to transmit before the next BSR report. This may e.g. be realized by transmitting dummy data (e.g. all zeroes, all one) or another specified bit pattern in the allocated uplink resource. An example may be given with reference to FIG. 10A. The two first UL occasions at 1002 are provided to empty the buffer, based on the BSR 85. A further UL occasion is allocated at 40 ms, based on the information 86 indicative of the packet arrival rate. However, even if the arrival rate as obtained or determined before sending the information 86 was at a certain level, the packet arrival rate may in fact decrease after the BSR 85 and the information 86 are transmitted. If the refilling of the buffer 126 is lower than a certain degree, e.g. compared to a certain threshold, or if the buffer 126 is emptied at the last UL occasion (at 40 ms), that UL occasion may also be used to include the predetermined bit pattern. Upon detecting the predetermined bit pattern from the UE in one uplink occasion, the base station 110 may be configured to withhold allocation of further resources to the UE until a subsequent BSR period, associated with the BSR 1004. This may be beneficial for minimizing unnecessary uplink resource allocation, and those resources may instead be allocated to other UEs or other purposes.

With reference back to FIG. 8, the various methods may involve the base station 110 allocating 809 resources for UL transmission of a data amount in a BSR period, based on the BSR 85 and the information 86 indicative of packet arrival rate, so as to provide resources for both the data based on the BSR 85 and on an additional amount of data determined based on said information 86. Specifically, said uplink resources are allocated to match both the data identified by the BSR and data determined to refill the buffer during the period based on the information indicative of packet arrival rate, and thereby to be sufficient for UL transmission in the BSR period of that aggregated data. The base station 101 transmits 810 UL resource information 87 for receipt 811 in the UE 1, which resource information 87 is allocated based on the BSR and the information 86. The UE 1 is thereby configured to transmit 812 data for receipt 813 in the base station 110, using said resource information.

Various embodiments have been outlined above, and except where they are clearly contradictory, they may be combined in any form.

The invention claimed is:

1. Method carried out in a User Equipment (UE) for controlling uplink transmission of data to a base station of a wireless network, comprising:
   transmitting, to the base station, a buffer status report (BSR) indicative of a data level value of a transmit buffer of the UE;
   determining a packet arrival rate of data entering the transmit buffer, wherein the packet arrival rate is determined at a point in time between transmission of said BSR and a preceding BSR, or concurrently with obtaining the data level value;
   transmitting, to the base station, information indicative of the packet arrival rate;
   receiving uplink resource information from the base station, in response to the BSR and said information; and
   transmitting data from the buffer using the received resource information.

2. The method of claim 1, wherein the information indicative of packet arrival rate is transmitted with the BSR.

3. The method of claim 1, wherein the information indicative of packet arrival rate is selectively transmitted based on BSR control data.

4. The method of claim 3, wherein the BSR control data is dependent on an application providing data to the buffer.

5. The method of claim 3, wherein the BSR control data is dependent on a Quality of Service (QOS) requirement.

6. The method of any of claim 3, wherein the BSR control data is determined by the UE.

7. The method of claim 3, wherein the BSR control data is received from the base station.

8. The method of claim 1, wherein the information indicative of packet arrival rate comprises packet arrival rate measured by the UE.

9. The method of claim 1, wherein the information indicative of packet arrival rate comprises a data value representing a quantized arrival rate level.

10. The method of claim 1, wherein the information indicative of packet arrival rate comprises a data value representing a relative arrival rate level.

11. The method of claim 1, wherein the information indicative of packet arrival rate comprises a flag indicating delay sensitive packet transmission.

12. The method of claim 1, wherein the information indicative of packet arrival rate comprises a time distribution indicator associated with data in the buffer.

13. A method carried out in a User Equipment (UE) for controlling uplink transmission of data to a base station of a wireless network, comprising:
    transmitting, to the base station, a buffer status report (BSR) indicative of a data level value of a transmit buffer of the UE;
    transmitting, to the base station, information indicative of a packet arrival rate of data entering the transmit buffer;
    receiving uplink resource information from the base station, in response to the BSR and said information; and
    transmitting a predetermined bit pattern using the received resource information, based on the buffer not containing any data scheduled prior to a subsequent BSR.

14. Method carried out in a base station of a wireless network for controlling uplink transmission of data from a User Equipment (UE) comprising:
    receiving, from the UE, a buffer status report (BSR) indicative of a data level value of a transmit buffer of the UE;
    obtaining information associated with the data in the transmit buffer;
    transmitting, dependent on the information associated with the data, BSR control data to the UE, to control the UE to transmit information indicative of packet arrival rate of data entering the transmit buffer;
    receiving, from the UE, the information indicative of packet arrival rate;
    transmitting, to the UE, uplink resource information allocated in response to the BSR and said information; and
    receiving data from the UE, transmitted using said resource information.

15. The method of claim 14, wherein the information indicative of packet arrival rate is received with the BSR.

16. The method of claim 14, wherein the BSR control data is dependent on an application providing data to the buffer.

17. The method of claim 14, wherein the BSR control data is dependent on a Quality of Service (QOS) requirement.

* * * * *